United States Patent [19]

Kim et al.

[11] Patent Number: 4,791,077

[45] Date of Patent: Dec. 13, 1988

[54] NEAR NET SHAPE FUSED CAST REFRACTORIES AND PROCESS FOR THEIR MANUFACTURE BY RAPID MELTING/CONTROLLED RAPID COOLING

[75] Inventors: Jonathan J. Kim, Williamsville; Thomas A. Myles, Amherst, both of N.Y.

[73] Assignee: Stemcor Corporation, Cleveland, Ohio

[21] Appl. No.: 826,636

[22] Filed: Feb. 4, 1986

[51] Int. Cl.$^4$ ..................... C04B 35/10; C04B 35/48
[52] U.S. Cl. ................................. 501/105; 501/103
[58] Field of Search ............................. 501/103, 105

[56] References Cited

U.S. PATENT DOCUMENTS

| | | | |
|---|---|---|---|
| 4,063,955 | 12/1977 | Fritsch, Jr. et al. | 501/9 |
| 4,158,569 | 6/1979 | Brothers et al. | 106/66 |
| 4,219,344 | 8/1980 | Armistead et al. | 501/9 |
| 4,294,795 | 10/1981 | Haga et al. | 501/103 |
| 4,300,953 | 11/1981 | Lachman | 501/9 |
| 4,336,339 | 6/1982 | Okumiya et al. | 501/103 |

OTHER PUBLICATIONS

Coes, et al., "Advanced Materials Systems"—Thermally Sprayed Coatings and Monolithic Refractory Shapes SAE 700049 (1970).

Scott, "Plasma-Sprayed Ceramic Coatings," Proc. Brit. Ceramic Soc., No. 34 (1984) pp. 195-206.

Primary Examiner—Mark L. Bell
Attorney, Agent, or Firm—George W. Moxon, II; Joseph G. Curatolo; Larry W. Evans

[57] ABSTRACT

Fused cast refractory moldings having a random microstructure, which are near in size and configuration to the desired final shape, and process and apparatus used in their manufacture are described. The process includes rapid melting of the refractory material followed by controlled rapid cooling. Laminated composite fused cast refractories may be produced.

2 Claims, 2 Drawing Sheets

NEAR NET SHAPE FUSED CAST REFRACTORIES AND PROCESS FOR THEIR MANUFACTURE BY RAPID MELTING/CONTROLLED RAPID COOLING

The present invention relates to directly produced fused cast refractories which, as manufactured, are near in size and configuration to the desired final product as manufactured, and to a process for their manufacture which involves rapid melting and controlled, rapid cooling.

More particularly, the present invention is directed to a manufacturing process for near net shape fused cast refractories and to novel fused cast refractories which result from use of the present rapid melting, controlled rapid cooling process. The term "near net shape" as used herein means that the castings or moldings are near in size and configuration as cast or molded, and little or no material need be removed to prepare the moldings for use. The directly fusion cast refractories of the present invention are distinguished from those known in the art by a random microstructure throughout, as well as by other characteristics to be described herein. The term "random" as used herein in reference to microstructure means that the microstructure is non-directional in its crystal orientation.

Fused cast refractories have been known and used for many years. Such refractories have presented many advantages in certain uses over the older type of refractory products which comprise granular heat-resistant materials bonded in desired shapes with other heat-resistant ceramic materials. These older types of refractory moldings are also known as the "burned" and the "non-burned" types. These bonded refractories are produced by packing together refractory particles which have a large number of open pores between them. These particles are joined together by a bonding phase. When this refractory matrix is attacked by the action of an erosive or corrosive material, e.g., blast furnace slag, molten glass or the like, the fine particle portion of the matrix is predominantly eroded. Due to their interconnected porous nature, attack occurs beyond the exposed face of the refractory product.

A second classification of refractories is known as "fused cast" or "fusion cast" or "electrocast" refractories. These refractories have a very dense structure and hence high-strength and erosion resistance. They do not exhibit or contain interconnected pores.

A conventional fused cast refractory is manufactured by melting a mixture of the desired composition in an electric furnace similar to that used for the manufacture of fused alumina for use in abrasives. Such electric furnace includes a water-cooled iron or steel shell without any lining other than that built up by the material being fused as it is fed into the furnace. Fusion is initially effected by heat from an electric arc between two or more electrodes inserted in the iron shell. After a bath of molten material is formed, the resistance of this material to passage of electric current through it is used to supply heat. The material to be melted is gradually introduced and the electrodes gradually raised as the fused mass accumulates. Apparatus of this type is shown and described in U.S. Pat. No. 929,517 to F. J. Tone. Following fusion of the ingredients, the molten material is cast into a suitable mold by tapping or tilting the furnace so that the molten mass flows into the mold. The molten material is heated to a temperature considerably above its melting point prior to casting. The mold is commonly made of graphite, although it may be formed of other suitable materials. The mold is provided with a riser or header of ample size to enable complete filling of the mold without interference by material freezing in the headers. The cast piece is left in its respective mold for heat treatment, or removed from the mold after the outer walls of the casting have solidified and then annealed without other than its own support. Such annealing generally takes several days and may be accomplished by covering the cast parts with hot sand or other insulating material. The cast parts are generally packed closer together, thereby allowing them to anneal by virtue of their own heat. Such annealing is necessary to prevent excessive localized shrinkage upon cooling which gives rise to stresses sufficient to result in fracture. Annealing may also be accomplished by placing the piece in a furnace and gradually reducing the temperature. After the pieces have cooled, the cast parts are inspected and finished by diamond cutting and/or grinding. The header may be removed shortly after casting or after annealing. The amount of material in the header is often about equal to the amount of material in the desired finished refractory piece. Header material is commonly recycled, but at considerable expense. The casting and annealing process is described in U.S. Pat. No. 2,279,260.

In known processes for the manufacture of fused cast refractories, the molten material is well above its fusion temperature when cast and a long cooling period is involved before complete solidification occurs. As a result, conventional fused cast products have a directional crystalline structure which is fine grained adjacent the surfaces of the casting and increasingly coarse grained directionally toward the center or last portion to cool. The crystalline structure and chemical composition of the casting changes from surface to center according to the rate of cooling and the liquid-solid phase diagram for the composition that was cast, all of which determine the nature of and the rate of advance of the solidification front. Additionally, the chemical composition of conventional fused cast refractories is not uniform due to stratification in the furnace and mold caused by heavier materials such as $ZrO_2$ and $Cr_2O_3$ settling toward the bottom due to gravity. Typical cooling rates used in the manufacture of conventional fused cast refractories are of the order from about 10° C. to about 50° C. per hour. Also, carbon is introduced into the melt by the graphite electrodes of the electric arc furnace. This carbon can cause carbon monoxide and silicon monoxide evolution, resulting in pores in the conventional fused cast product. Also, it is known that conventional fused cast refractories contain carbon in amounts up to ½ percent. Carbon is undesired when the refractory is used as lining of glass manufacturing tanks.

Many different compositions for fused cast refractories have been previously suggested and it has been found that for specific uses certain compositions are superior. Such fused cast refractories are for example, suggested in U.S. Pat. Nos. 2,063,154; 2,279,260; 2,911,313; 3,188,219; 3,232,776; 3,759,728; 3,773,531; 4,158,569; 4,490,474, as well as others. Any of these compositions, as well as many others, may be used in conjunction with the present invention.

The use of plasma to heat or treat materials is widely known for certain applications, as exemplified by the following.

U.S. Pat. No. 3,257,196 discloses an apparatus and process for treating a powdery refractory material by directly contacting it with a stream of plasma.

U.S. Pat. Nos. 3,429,962 and 3,645,894 describe the preparation of metallic oxide layers and bodies consisting thereof by plasma spray deposition of substantially spherically shaped agglomerate particles of metal oxides onto a metallic mandrel which is thereafter etched away. The process of the present invention is distinguished because a molten layer is maintained which serves to assist capture of the particles being thrown. In conventional plasma spray coating as described in U.S. Pat. Nos. 3,429,962 and 3,645,894, a high percentage, e.g., 30 to 40 percent of the particles thrown, are not captured because the surface is totally solid and must be to avoid melting of the metal substrate. Also, according to the prior art plasma spray techniques, the resulting ceramic layer is of high porosity.

U.S. Pat. No. 3,777,044 discloses a plasma arc furnace for remelting of sheet waste material of high reactivity metals and their alloys. The waste material to be melted is presented in the form of a consumable electrode.

U.S. Pat. No. 4,119,472 is directed to fired refractory articles formed of rebonded, fusion cast alumina/zirconia/silica refractory grain.

U.S. Pat. No. 4,426,709 describes a transferred arc plasma heated furnace for the production of steel from solid and/or liquid charging materlals.

Koshi Kato, in an article entitled "Plasma Melting," published in *Taikabutsu Overseas*, Vol. 4, No. 2, 1984, generally describes plasma melting and many of its various applications, and several types of plasma melting furnaces. Among these is described a plasma progressive casting furnace which utilizes one or more torches to melt raw materials in a water-cooled crucible, the bottom of which is lowered as the melting process proceeds to cool the molten metal successively from the bottom. In his conclusion, this author indicates that higher melting point materials such as ceramic will be processed by these furnaces in the future.

SUMMARY OF THE INVENTION

In accordance with the present invention, it has been discovered that refractory fusion cast moldings can be directly produced by rapidly heating refractory particles by exposing them to a plasma, depositing the heated refractory particles into a mold, allowing the heated particles to at least partly coalesce into a fused mass while in the mold, and thereafter rapidly cooling the fused mass in a controlled manner to form a fully solidified molding having a random microstructure throughout. A random microstructure as used herein means that crystal growth orientation is non-directional when a cross-sectional view including the center or last solidified portion of the molding is compared to that of a conventional fused cast refractory which has a generally radially oriented crystal growth pattern from surface to center or last solidified portion of the refractory. The refractory fusion cast moldings of the present invention are further characterized by a generally fine microstructure throughout, the absence of a header, and closed pores distributed throughout. These characteristics may be uniform throughout the cast product or varied in accordance with the desires of the designer or manufacturer. In contrast, in conventional fused cast refractories, the microstructure is fine adjacent to mold due to rapid cooling at and adjacent the mold surfaces, but becomes very coarse away from the edges as the center or last portion to solidify of the casting is reached. The present invention is not limited to any particular chemistry. It expands the range of compositions which may be fused cast. It enables production of fused cast moldings which are entirely free of carbon. It is believed that compositions which are not electrically conductive when molten may be processed.

Figure 1:
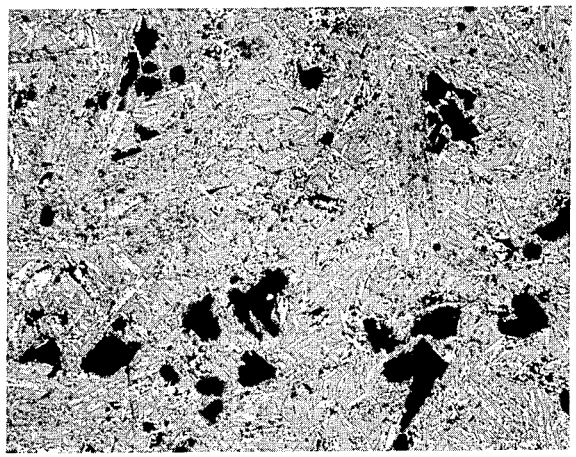
FIGS. 1 and 2 show at a magnification of 50 times the microstructure of a refractory molding according to the present invention, FIG. 1 being representative of the microstructure about ¾ inch from the wall of the mold and FIG. 2 being representative of the coarsest or worst case microstructure about 3 inches from the mold wall.
Figure 2:
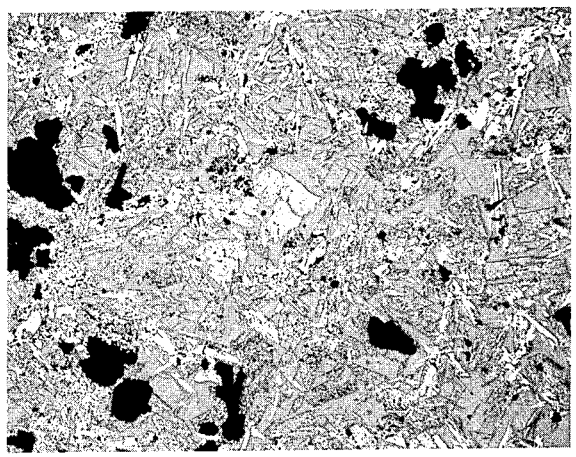
Figure 4:
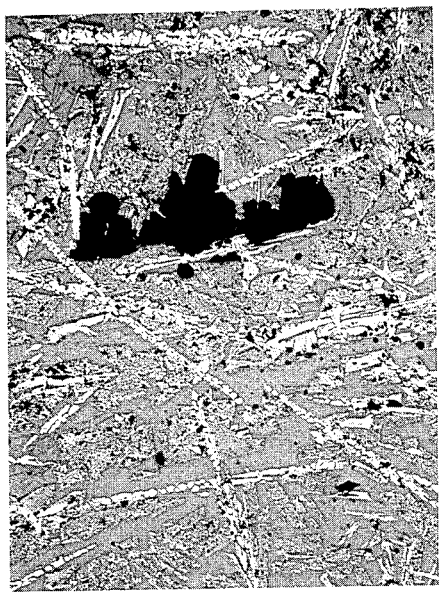
FIGS. 3, 4 and 5 representatively show at a magnification of 50 times the microstructure of fused cast refractories according to the prior art at distances of approximately ½ inch, 1½ inches and 2½ inches from the mold surface.
Figure 5:
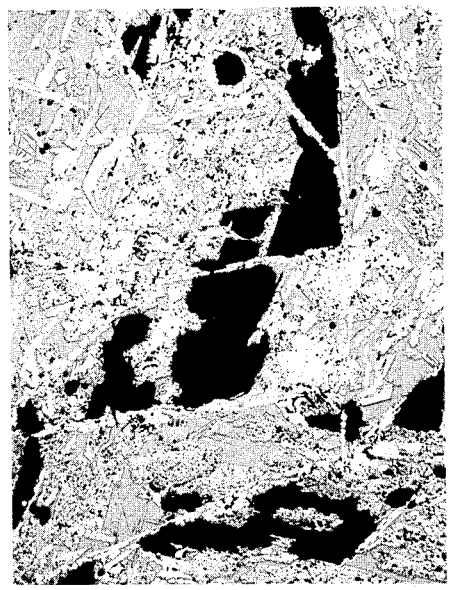
Figure 3:
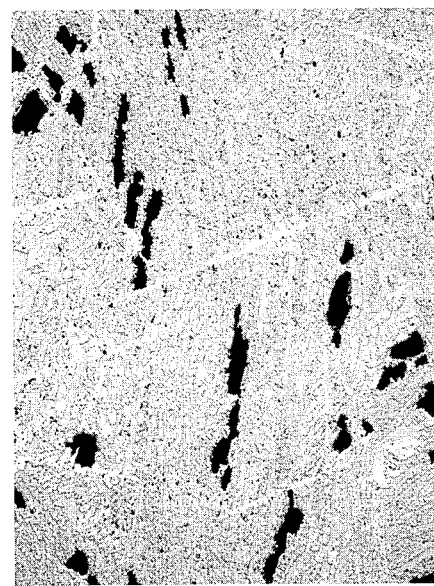

It is to be understood that FIGS. 1 through 5 are representative of fused cast refractory moldings produced from 50 percent alumina/34 percent zirconia/14 percent silica, with the remainder being alkali and alkaline oxides. Alumina/zirconia/silica will be referred to hereinafter as AZS. In this specification and the appended claims, all percentages, ratios and fractions unless otherwise specified are given on a weight basis. The conventional fused cast product represented in FIGS. 3-5 is commercially available from Sohio Engineered Materials Company, Niagara Falls, NY (formerly The Carborundum Company) and is known as Monofrax ® S-3. The refractory molding depicted in FIGS. 1 and 2 was formed from the same bulk composition. The white area in each microstructure is dendritic zirconia. The lighter gray area is corundum with co-precipitated zirconia. The darker gray areas are high silica glass. The black areas represent voids.

DETAILED DESCRIPTION OF THE INVENTION

Referring to FIGS. 1 and 2, there is shown the microstructure of directly produced refractory fusion cast moldings according to the present invention. These moldings are characterized by a generally random microstructure throughout in contrast to the highly directional microstructure which is present in conventional fused cast refractories of like composition such as those depicted in FIGS. 3-5. As shown in FIGS. 1 and 2, the refractory moldings according to the present invention are also characterized by a generally fine microstructure throughout and by closed pores which are distributed throughout. These characteristics are generally uniform throughout the entire directly fusion cast body, when viewed as a whole, although they may be intentionally altered by varying the processing parameters during casting.

In contrast, in prior art fusion cast refractories the microstructure is very fine gralned adjacent the mold surfaces due to very rapid cooling, but coarsens rapidly with distance from the surface of the casting. The microstructure depicted in FIG. 3 extends less than about 1 inch from the surface of the mold. As shown in FIG. 4, at a distance of 1½ inches from the surface of the casting, the microstructure is greatly coarsened when compared to that adjacent the mold or casting surface, as shown in FIG. 3. At a distance of 2½ inches from the surface of the casting, as shown in FIG. 5, the microstructure is further coarsened.

A further distinction between fused cast refractory moldings according to the present invention and those of the prior art is in uniformity of composition throughout the molding. In moldings according to the present invention the composition is generally uniform throughout, unless intentionally varied, whereas in moldings according to the prior art the composition necessarily varies as gradual cooling and crystallization occurs and due to stratification as described hereinabove. As the temperature is gradually lowered during the slow cooling which exists in conventional fused cast refractories, the higher solidification point composition crystallizes first, thus shifting the chemistry of the remaining liquidus. In contrast, in moldings according to the present invention there is insufficient time for such shifts in chemistry to occur, or for stratification of the liquidus due to gravity.

Another distinction between fused cast refractory moldings according to the present invention and those of prior art is the purity of moldings according to the present invention which are entirely free of carbon in their interiors. Slight carbon contamination may be present at or adjacent the surfaces which contact a graphite mold.

The mechanism in conventional fused cast refractories may be visualized as an advancing solidification front which sweeps the lowest melting point phase from the surface of the molding to the center or last portion to cool. The solidification rate is rapid at the surfaces of the molding but slows markedly as the solidification front advances inward. Because the surfaces of the molding are firs solidified and thereafter the interior solidifies and shrinks in conventional castings, there results a large void at the last part of the casting to cool. This void is known to those skilled in the art as a "vug." Moldings according to the present invention may also contain a vug, but its size may be reduced.

For the particular AZS system shown n FIGS. 1-5, one can observe that the amount of voids and the amount of silica glass in FIG. 5 is considerably greater and differently distributed than in FIGS. 1 and 2 which are representative of this same feedstream chemistry utilizing the present invention.

Fusion cast refractory moldings according to the present invention have a fine, non-directional microstructure when compared to their conventional fused cast counterparts. For the specific AZS system depicted in FIGS. 1 and 2, there is an absence of coarse, dendritic zirconia in contrast to the microstructure of the conventional fused cast product of the same composition which contains laths of corundum mottled with zirconia in siliceous glass. For the AZS system depicted in FIGS. 1 and 2 according to the present invention, the refractory moldings have fine, non-directional precipitates of zirconia with corundum. This is due to the small amount of liquidus present at any given time due to the rapid melting by the very intense heat from the transferred arc DC plasma and concurrent rapid cooling to the mold. The glassy phase of the product according to the present invention is random in contrast to the laths of corumdum mottled with zirconia which are present in the conventional fused cast product. The fusion cast AZS molding according to the present invention has a pearlitic structure. The fused cast molding according to the present invention contains closed pores distributed generally evenly throughout rather than being concentrated as gas bubbles rise toward the header in conventional fused cast refractories. The size of these pores can be controlled., they can be almost eliminated by close control of the process. Some pores will naturally occur due to the amount of shrinkage inherent in the composition being cast. In contrast, in conventional fused cast refractories of the same bulk composition, there are many aggregated pores at the center or last region to solidify. The distribution of the pores cannot be controlled other than to attempt to counter this effect by use of a large header at great expense. No header is necessary in fused cast moldings according to the present invention. In contrast, a large header, often equal in mass to the part being cast, is necessary to offset the shrinkage inherent in the conventional fused cast process.

Large area thin sections, e.g., tiles of 1 inch × 12 inches × 12 inches, can be produced directly according to the present invention. In contrast, when the conventional fused cast process is employed, it is necessary to make a large block which is thereafter sliced into tiles because rapid heat withdrawal by the mold prevents reliable complete filling. These conventional tiles vary in microstructure according to where they are taken from the large block, or vary from edge to center as inherent in the large cast block.

It is to be understood that the particular microstructures given in FIGS. 1-5 are indicative of the results obtained when the specific AZS chemistry is being utilized. Different microstructures are expected when different chemicals systems are cast, but the general observations as to the differences in directionality and uniformity between those produced according to the present invention and those produced according to prior art methods will always be present.

PROCESS OF MANUFACTURE

Figure 6:
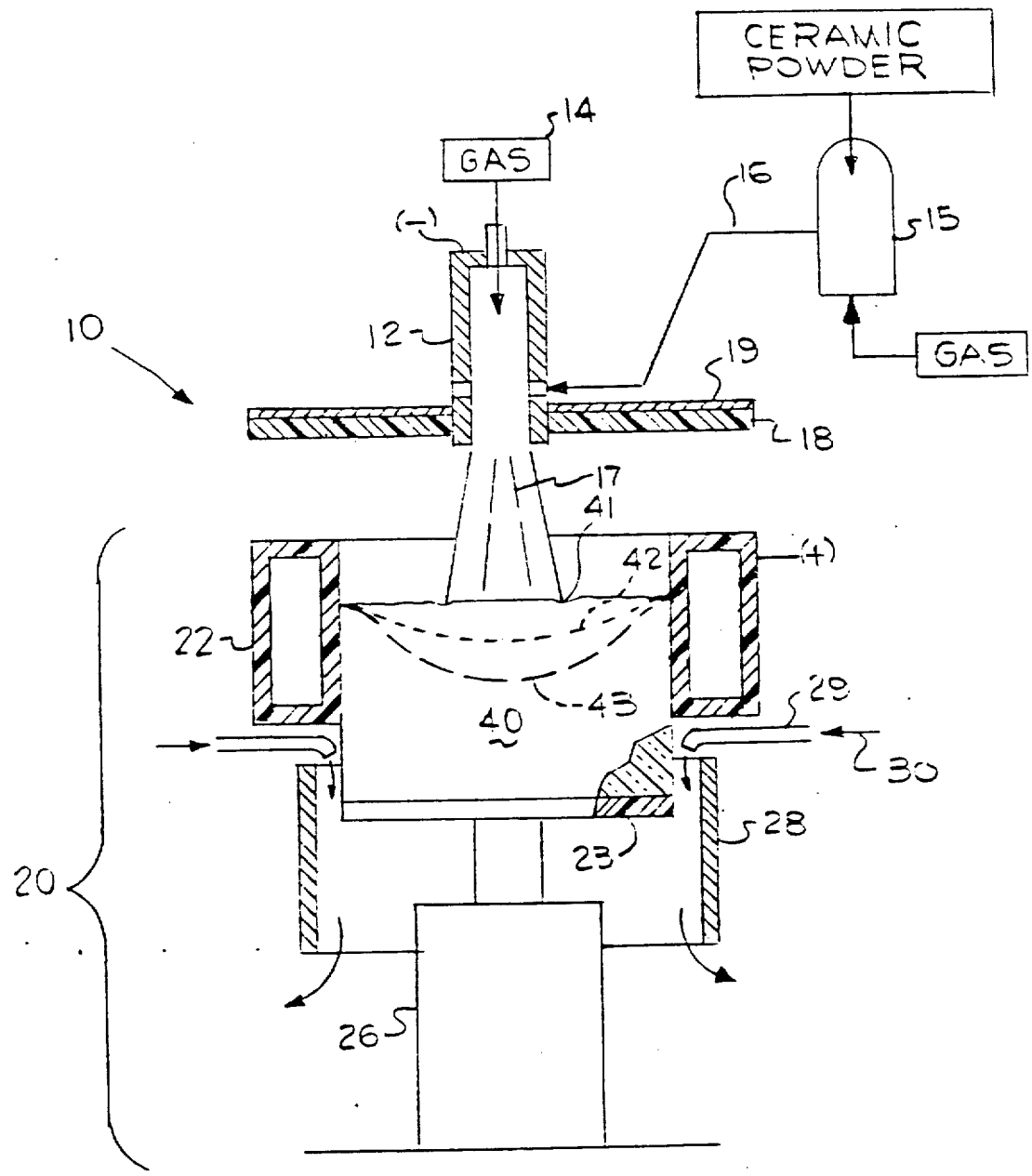
FIG. 6 is a schematic elevation view, partly in section, showing a preferred apparatus and process embodiment according to the present invention for the manufacture of directly fused cast refractory bodies of the present invention.

In FIG. 6, there is illustrated schematically a casting apparatus 10 for use in the present invention. This apparatus may be termed a "plasma progressive casting furnace." Apparatus 10 includes a plasma torch 12 and its supporting means (not illustrated), an electrical power supply (not illustrated) and a source of gas 14 which is to be introduced into the plasma torch 12 for conversion by electrcal energy into a high temperature plasma. The torch 12 itself may be of conventional design and does not constitute a part of the present invention. It is highly preferred that torch 12 be of a configuration intended for generation of transferred arc DC plasma, although it is believed that other types of plasma, such as RF plasma and DC non-transferred arc plasma, are als operable. An oxygen-hydrocarbon gas torch may be operable. DC transferred arc plasma is highly preferred due to its extremely high energy concentration and the high capture efficiency of the charged refractory particles which projected into the mold 20. For example, a 100 KW torch can be focused to project its output on an area of between 3 and 6 square inches. Such heat intensity cannot be achieved by use of a propane gas torch such as that described in U.K. patent publication No. 2104056A.

Refractory powder 16 is introduced into the torch 12 from refractory powder source 15. Emitted from the torch 12 during its operation is a stream 17 of high-temperature plasma containing refractory particles which are being heated as they are projected from the torch toward the mold bottom plate 23. The mold 20 also includes a water-cooled mold collar 22 which is connected to the anode (positive electrode) of the electrical power supply. Plasma torch 12 is connected to the cathode (negative terminal) of the electrical power supply. The mold bottom plate 23 is attached to a lowering mechanism 26 which is slowly lowered as casting progresses into the water-cooled mold collar 22. The uppermost solid line 41 of refractory molding 40 represents the physical contour of the refractory particles as they are projected toward mold bottom plate 23 and are captured and converted to a fused layer at the top of refractory molding 40. This fused layer is normally quite fluid, i.e., of low viscosity, at its surface and waves may be observed during formation of highly dense moldings. At the temperatures normally involved, i.e., greater than 1000° C., heat energy is rapidly radiated outwardly and absorbed by water-cooled mold collar 22 and downwardly to be absorbed by plate 23. Dotted line 42 represents the isotherm profile at which the first phase solidifies from the fused layer above it. Because cooling is somewhat more rapid at the sides than in the center of the molding, line 42 is depressed at its center relative to its ends. Line 43 represents the isotherm profile of the top of the fully solidifed refractory molding 40 during its manufacture. All material below line 43 in refractory molding 40 is fully solidified. Complete solidification may be obtained within two minutes of refractory powder projection in the production of moldings. Although longer solidification times are within the inventon, the risk of stratification increases as the time increases. Solidification time should be maintained below 10 minutes and more desirably below 5 minutes to minimize stratification. A 3 inch by 9 inch cross-sectional molding of AZS may be produced at the rate of between about 0.4 and 0.8 inches depth per minute with a 100 KW torch. The depth of the liquidus is about 1 inch maximum during formation.

When it is desired to produce fused cast refractory moldings of dimensions greater than 6 inches lineal dimension of projected area, the plasma torch 12 and its supply systems may be mounted on a traverse mechanism, not shown, or alternately the mold 20 may be mounted on a traverse mechanism, not shown. The plasma torch 12 in this instance is desirably fitted with a water-cooled radiation shield 18 joined to a structural backing member 19, e.g., of metal. When large area dimension moldings are to be produced, much of the heat in the fused layer of the fusion casting is retained by radiation shield 18.

The refractory molding 40, as it exits the bottom opening of mold collar 22. is completely solidified. At this point it may be allowed to cool in air or, optionally, be subjected to further forced rapid cooling. Such secondary cooling may be accomplished by provision of a secondary cooling collar 28 which is spaced outwardly from refractory molding 40. Secondary cooling is accomplished by injecting a cooling fluid 30 through secondary cooling gas nozzles 29. The cooling fluid impinges upon refractory molding 40 and flows between refractory molding 40 and secondary cooling collar 28. The fluid may be gas, such as air or water. Collar 28 may be water cooled.

As previously stated, it is highly preferred to use a DC transferred arc plasma. The gas to be converted into a plasma may be any gas; however, for the commercial manufacture of known refractory compositions this gas will usually be a non-oxygen-containing gas such as nitrogen or oxygen-containing air, the choice being dependent on the composition of the particular refractory desired to be made. In the manufacture of the AZS refractory moldings whose microstructure is depicted in FIGS. 1 and 2, nitrogen gas was utilized for stream 14 and air for powder stream 16. Suitable materials for radiation shield 18 include carbon felt or other refractory. including AZS refractory. Water-cooled mold collar 22 is preferably made of graphite, as is water-cooled mold bottom plate 23. Secondary cooling collar 28 may be formed of graphite or refractory material or metal.

Gas evolution from the molten casting is desired to prevent formation of porosity beyond that which is induced solely by thermal shrinkage. Evolution of gases, e.g., SiO, $Na_2O$ and CO is easily accomplished during manufacture of fusion cast moldings according to the present invention because the only liquid present is at or near the upper surface of the molding. Additionally, less quantity of gas is generated because no carbon is introduced when nitrogen or other carbon-free gas is converted electrically to plasma in a metal torch. In contrast, in standard fused cast refractories, gas evolution is difficult due to the large volume of liquidus and the header. The mold must be configured and positioned such that gases can rise through the cast part into the header and, at best, is only partly effective unless a great amount of waste is accepted with attendant premium cost. Also, in the conventional fusion cast process, graphite electrodes are employed to melt the refractory material. During the melting, carbon from these electrodes is introduced into the melt, some of which is converted to carbon monoxide and silica $SiO_2$ is converted to silicon monoxide gas.

Additionally, the process of the present invention is considerably more energy efficient than conventional fused cast processes. This is largely due to the lack of a header when the process of the invention is practiced.

The process of the present invention may be utilized to produce composite, directly joined, fused cast refractories heretofore impossible or impractical. A second refractory composition may be projected directly upon a first refractory composition previously cast or simultaneously projected side-by-side from a second torch system to directly join them. Refractory particles of a first composition may be deposited in a mold for a time sufficient to form a molding that is at least partly solidified, and thereafter refractory particles of a second composition may be deposited onto said molding to form a composite layered molding in which the first fused cast refractory material is directly joined to the second fused cast refractory material. A gradient or transition zone in composition is expected in such laminated composite moldings. Composite moldings in which a first refractory material envelopes and binds a second material may be produced. Such composite layered moldings enable considerable economic advantage. Only about three-fourths of the thickness of conventional fused cast refractories may be safely utilized before replacement. Such composite refractories enable full utilization of expensive materials such as $Cr_2O_3$ without recycling or early shutdown of production tanks on furnaces, with structural integrity being provided by less expensive refractory material as the higher refractory material is consumed.

EXAMPLE 1

Ninety-nine-plus percent pure zircon sand ($ZrO_2$:$SiO_2$) was blended with 99.5 percent pure alumina ($Al_2O_3$) to form a dry particulate mixture having the following proportions: 50 alumina/34 zirconia/14 silica. This powder mixture was introduced into the lower part of the bore of a DC transferred arc plasma torch at a rate of about 40 lb/hr, while controlling the power applied to maintain a surface temperature of the liquidus at about 2150° C. as indicated by an optical pyrometer without compensation for emissivity of the molten AZS. Nominal power level of the torch was about 70 KW. The stream of plasma and heated refractory particles was projected downwardly into a water-cooled graphite mold whose interior dimensions were 3 inches×9 inches in plan view and 4½ inches in elevation view. A refractory molding corresponding in size and shape to the interior of the graphite mold was produced in about 24 minutes. After casting, the molding was removed from the graphite mold, allowed to cool in ambient air for about two minutes and then quenched by immersion in water. Analysis of the resulting cooled refractory molding revealed a fine, uniform, non-directional microstructure throughout and the presence of a small vug at the center of the molding.

EXAMPLE 2

Example 1 was repeated except that the molding was allowed to cool in ambient air. Analysis of the cooled refractory casting revealed a fine, uniform, non-directional microstructure. The vug was considerably larger than in Example 1.

EXAMPLE 3

Example 1 was repeated except that power applied to the torch was reduced to maintain a liquidus surface temperature of about 1950° C. The nominal power level of the torch was about 60 KW. The resulting water-quenched molding had a fine, uniform, non-directional microstructure having closed porosity of generally even size and distribution throughout. This porosity is believed due to trapped gas which could not escape prior to solidification because the viscosity of the liquidus was too high and duration of its existence was too short during casting.

The foregoing description and embodiments are intended to illustrate the invention without limiting it thereby. It will be understood that various modifications can be made in the invention which are obvious from the embodiments which have been described in detail. These variations are intended to be included within the present specification and claims. Examples of such variations are the following. Multiple plasma torches could be employed. The refractory powder material could be passed longitudinally through the torch or introduced at a different point along the length of the torch or introduced into the plasma following its exit from the torch. The refractory powder could be introduced via belt or screw type or vibratory conveyers rather than through gas transport. Multiple torches and multiple feedstreams having differing compositions could be employed. The secondary cooling collar could itself contain openings for introduction of secondary cooling fluid. The secondary cooling collar could be liquid cooled. The mold collar could be commensurate in height to he depth of the molding to be produced and the bottom plate could be fixed rather than movable.

What is claimed is:

1. A refractory fusion cast molding of alumina-zirconia-silica composition characterized in its as-cast form by the absence of a header and having throughout a generally random, uniform microstructure, generally evenly distributed closed pores and generally uniform chemistry.

2. The molding of claim 1 further characterized by a generally fine microstructure throughout.

* * * * *

UNITED STATES PATENT AND TRADEMARK OFFICE
CERTIFICATE OF CORRECTION

PATENT NO.  : 4,791,077

DATED       : December 13, 1988

INVENTOR(S) : Jonathan J. Kim et al.

It is certified that error appears in the above-identified patent and that said Letters Patent is hereby corrected as shown below:

Insert Figure 6, as part of Letters Patent as shown on the attached sheet.

On The Title Page, "2 Claims, 2 Drawing Sheets" should read -- 2 Claims, 3 Drawing Sheets --.

Signed and Sealed this

Twenty-first Day of November, 1989

*Attest:*

JEFFREY M. SAMUELS

*Attesting Officer*     Acting Commissioner of Patents and Trademarks